Oct. 20, 1925.

A. H. WEAVER

CHAIN GEAR OILER

Filed Aug. 29, 1923

1,557,910

A. H. Weaver, Inventor

By
Attorney

Patented Oct. 20, 1925.

1,557,910

UNITED STATES PATENT OFFICE.

AMOS H. WEAVER, OF KINROSS, IOWA.

CHAIN-GEAR OILER.

Application filed August 29, 1923. Serial No. 659,979.

*To all whom it may concern:*

Be it known that I, AMOS H. WEAVER, a citizen of the United States, residing at Kinross, in the county of Keokuk and State of Iowa, have invented a new and useful Chain-Gear Oiler, of which the following is a specification.

This invention aims to provide a simple means for applying a lubricant to the driving surface of each tooth of a gear wheel, the gear wheel being lubricated adequately with a marked decrease in the amount of oil used.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

Figure 1:
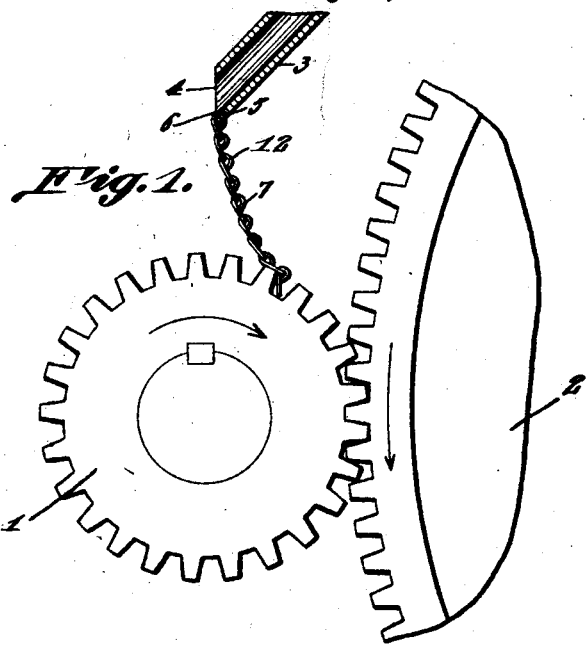
Figure 2:
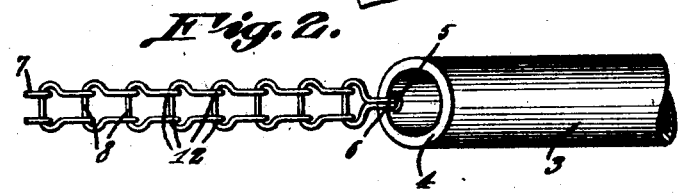
Figure 3:
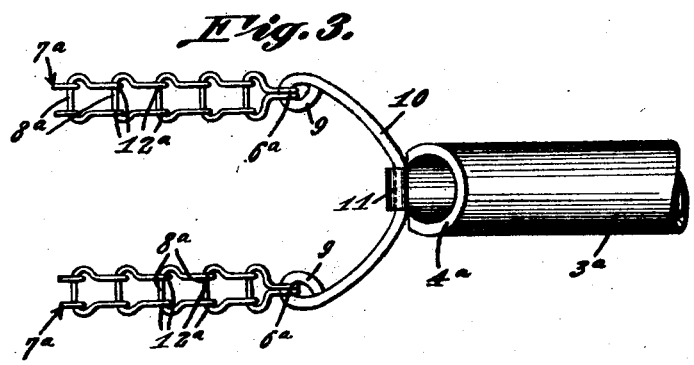

In the accompanying drawings:

Figure 1 shows in elevation, a device constructed in accordance with the invention; Figure 2 is a plan showing the delivery member and a portion of the flexible element which is assembled therewith; and Figure 3 is a view resembling Figure 2 but delineating a modification.

In Figure 1 of the drawings there are shown intermeshing gear wheels 1 and 2. A delivery member 3 is provided and may be of any desired sort. In the present embodiment of the invention, the delivery member 3 is in the form of a tube, having a beveled end 4, the oil flowing through the delivery member 3 by gravity, under pressure or otherwise. In the extremity of the delivery member 3 an opening 5 is fashioned, the same being adapted to receive a hook 6 carrying a flexible element of chain 7, which may be variously constructed as occasion may demand. In the present embodiment of the invention the chain 7 is made up of U-shaped links, each link having an end portion 8 disposed at right angles to the axis of the chain, the arms of each link being hooked, as at 12, about the end member 8 of an adjoining link. The lower end of the chain 7 trails on the teeth of the gear wheel 1 and when the gear wheel is rotated in the direction indicated by the arrow in Figure 1, the oil, flowing down the chain 7, will be supplied to the working surfaces of the teeth of the gear wheel 1. If, however, the direction of rotation of the gear wheel 1 be reversed, the chain 7 then will apply the lubricant to the opposite surfaces of the teeth, those surfaces then becoming the driving surfaces.

As many chains as is desired may be used. Thus, in Figure 3, therein parts hereinbefore described have been designated by numerals previously used, with the suffix "a", a tubular bearing 11 on the delivery member $3^a$ retains, for swinging movement, a curved yoke 10 having eyes 9 receiving the hook links $6^a$ of the chains $7^a$. This view demonstrates that a plurality of chains may be used should the width of the pinion require more than one chain for adequate lubrication.

The length of the chains 7—$7^a$ is such, of course that the free ends of the chains will in no case be caught between the intermeshing teeth of the gear wheels 1 and 2.

I claim:

1. The combination with a gear wheel, of a tube located above the gear wheel and inclined downwardly toward the gear wheel, the tube being beveled at its end along an approximately vertical line, a flexible element of such length as to trail on the gear wheel, and means for connecting the flexible element with the beveled end of the tube.

2. A device for lubricating gear wheels and the like, comprising a tube, a forked yoke connected intermediate its ends with the tube, and flexible elements assembled with the ends of the yoke.

In testimony that I claim the foregoing as my own, I have hereto affixed my signature.

AMOS H. WEAVER.